United States Patent [19]
Konoike et al.

[11] Patent Number: 4,485,180
[45] Date of Patent: Nov. 27, 1984

[54] HIGH FREQUENCY DIELECTRIC CERAMIC COMPOSITIONS

[75] Inventors: Takehiro Konoike; Hiroshi Tamura, both of Kyoto, Japan

[73] Assignee: Murata Manufacturing Co., Ltd., Kyoto, Japan

[21] Appl. No.: 527,762

[22] Filed: Aug. 30, 1983

[30] Foreign Application Priority Data

Sep. 6, 1982 [JP] Japan .................................. 57-155655
Feb. 9, 1983 [JP] Japan .................................... 58-20367

[51] Int. Cl.$^3$ .............................................. C04B 35/00
[52] U.S. Cl. ...................................... 501/135; 361/321; 423/266; 423/593
[58] Field of Search ................. 501/135; 423/266, 593

[56] References Cited

U.S. PATENT DOCUMENTS 3,464,785  9/1969  Galasso ............................ 423/598
4,121,941 10/1978  Kawashima et al. ............... 501/135

FOREIGN PATENT DOCUMENTS 53-35454 4/1978 Japan .
55-68004 5/1980 Japan ................... 501/135

OTHER PUBLICATIONS

Kawashima, S. et al., Proceedings of the First Meeting on Ferroelectric Materials and Their Applications, Kyoto 1977, "Dielectric Properties of Ba(Zn$_\frac{1}{3}$NB$_\frac{2}{3}$)O$_3$-Ba(Zn$_\frac{1}{3}$Ta$_\frac{2}{3}$)O$_3$ Ceramics at Microwave Frequency", pp. 293-296.

Annual Report of Study Group on Applied Ferroelectrics in Japan, vol. 30, (Feb. 1983), pp. 18-23.

Journal of the American Ceramic Society, (Jun. 1983), vol. 66, No. 6, pp. 421-423, "Ba(Zn$_\frac{1}{3}$Ta$_\frac{2}{3}$)O$_3$ Ceramics with Low Dielectric Loss at Microwave Frequencies."

*Primary Examiner*—Helen M. McCarthy
*Attorney, Agent, or Firm*—Finnegan, Henderson, Farabow, Garrett & Dunner

[57] ABSTRACT

A high frequency dielectric ceramic composition is described, said composition being represented by the formula: Ba(Zr$_x$Zn$_y$Ta$_z$)O$_{7/2-x/2-3y/2}$, wherein $0.02 \leq x \leq 0.13$, $0.28 \leq y \leq 0.33$ and $0.59 \leq z \leq 0.65$ (where $x+y+z=1$). The ceramic composition has a complex perovskite structure, provides a high dielectricity and high Q value at high frequency and selectively provides a temperature coefficient of resonant frequency with a center value of 0 ppm/°C., without using high sintering temperatures and/or long sintering times.

3 Claims, 10 Drawing Figures

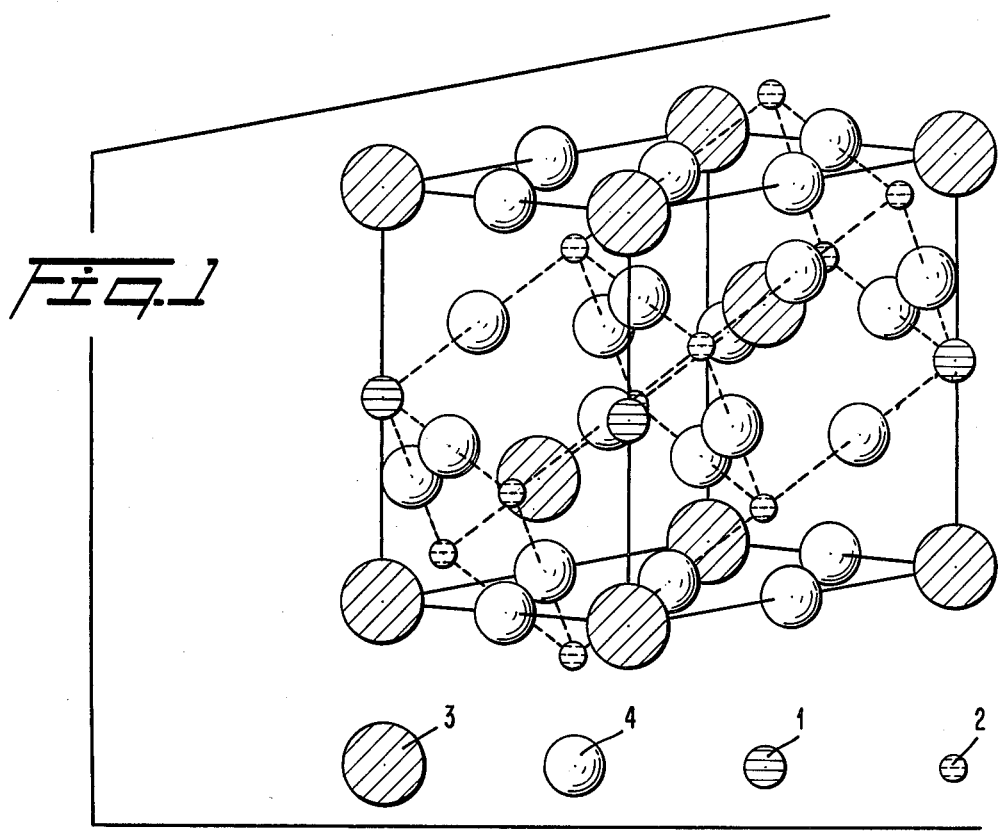
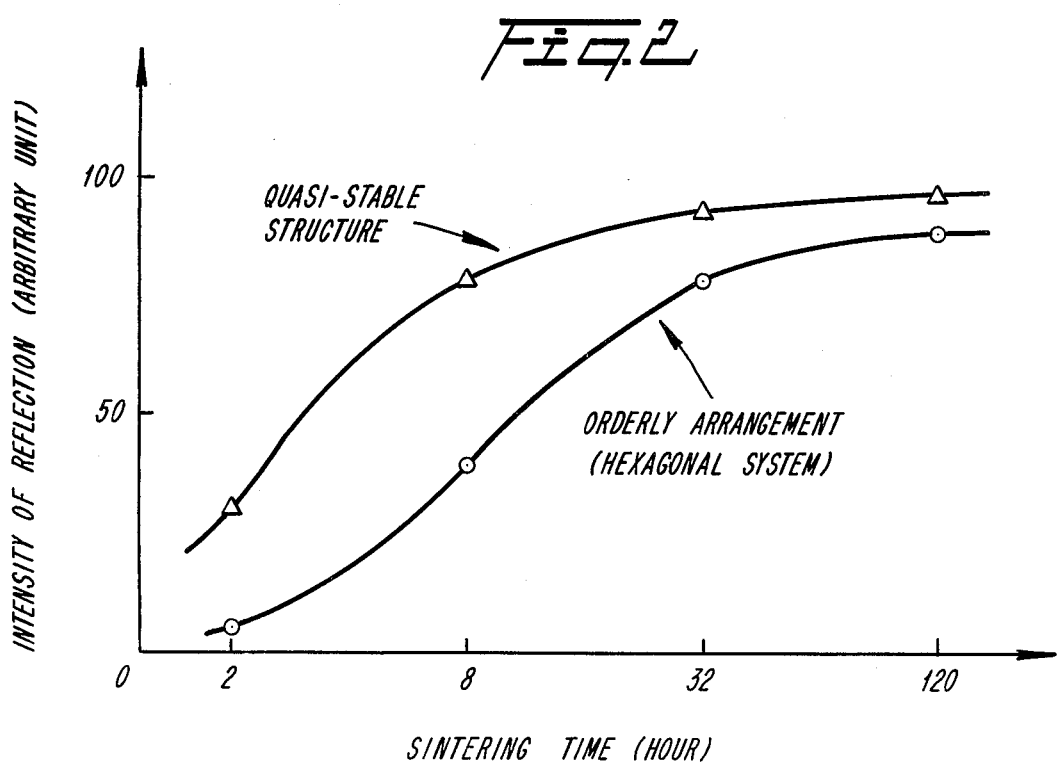

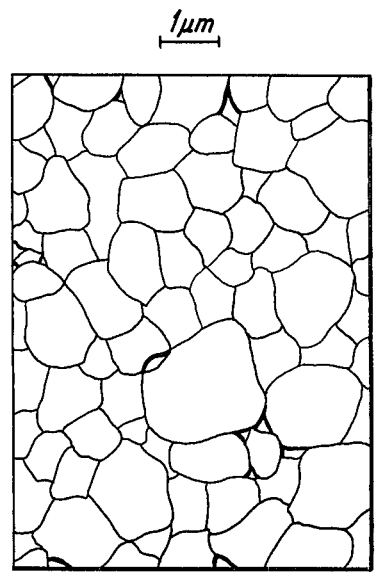
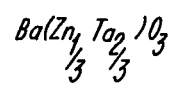
Ba(Zn$_{1/3}$Ta$_{2/3}$)O$_3$
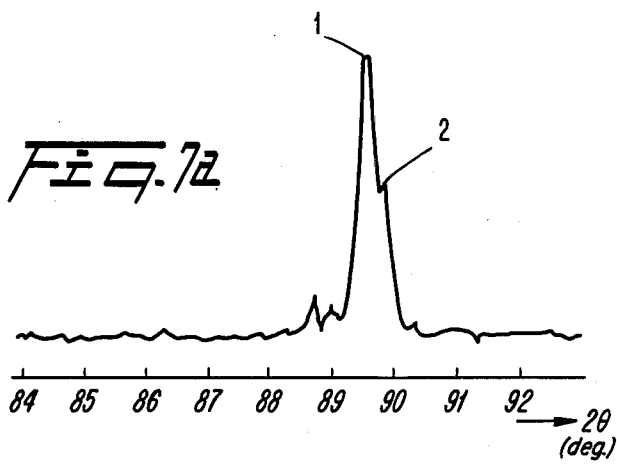
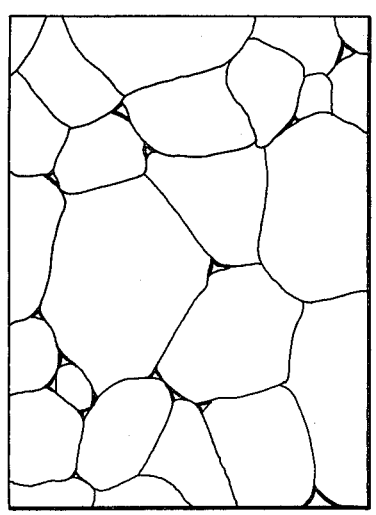
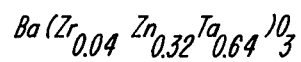
Ba(Zr$_{0.04}$Zn$_{0.32}$Ta$_{0.64}$)O$_3$
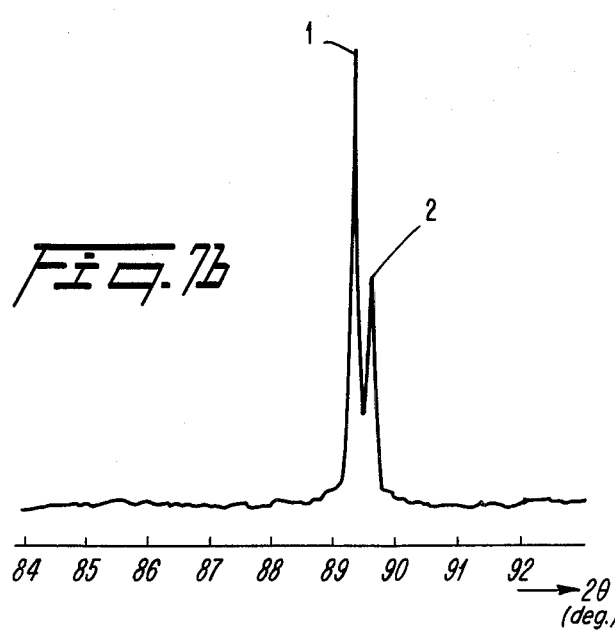

HIGH FREQUENCY DIELECTRIC CERAMIC COMPOSITIONS

FIELD OF THE INVENTION

The present invention relates to a dielectric ceramic composition for high frequency use.

BACKGROUND OF THE INVENTION

The dielectric ceramic has been widely utilized for a dielectric resonator and MIC dielectric substrate etc. for use in a high frequency region including microwave and/or millimeterwave regions.

As the dielectric ceramic for such a purpose, a variety of materials such as those belonging to $ZrO_2$—$SnO_2$—$TiO_2$ type, $Ba_2Ti_9O_{20}$, $(Ba,Sr)(Zr,Ti)O_3$ type or $BaO.ZnO.Ta_2O_5$ type etc. are known.

Although these materials have superior characteristics in microwave energy of a frequency of around 10 GHz, and having a dielectric constnat ($\epsilon r$) of 20 to 40, a Q of 2,000 to 6,000 and a temperature coefficient of resonant frequency ($\tau_f$) of around 0 ppm/°C. with the recent use of higher frequencies, it has been desired to provide a ceramic having a higher Q value.

For example, materials belonging to $Ba(Zn,Ta)O_3$ type are described in Japanese Patent Application (OPI) No. 35454/78 in detail (the term "OPI" as used herein refers to a "published unexamined Japanese patent application"). According to this reference a dielectric ceramic disc having a diameter of 5 mm and thickness of 2 mm obtained by sintering the disc at 1,360° to 1,460° C. in air for two hours has a dielectric constant ($\epsilon r$) measured from a resonant frequency (around 11 GHz) and the dimensions the unloaded Q measured by using the band reflection method and the temperature coefficient ($\tau_f$) of resonant frequency measured in a range −30° C. to +70° C., 25 to 30, 3,520 to 3,730 and 5 to 20, respectively.

The crystal structure of $Ba(Zn_{1/3}Ta_{2/3})O_3$ is disclosed in F. Gallasso and J. Pyle "Ordering in Compounds of the $A(B'_{0.33}Ta_{0.67})O_3$ type", Inorganic Chemistry, vol. 2, No. 3, pages 482–484 (1963). The material is a compound with a unit cell having a perovskite structure of the $ABO_3$ type. Zn and Ta are each B site ions and are ordered to form a hexagonal superlattice.

FIG. 1 shows the superlattice structure of $Ba(Zn_{1/3}Ta_{2/3})O_3$ which is similar to $Ba(Sr_{1/3}Ta_{2/3})O_3$ disclosed in the above-mentioned paper. In FIG. 1, Zn(1) and Ta(2) in the B site ions are ordered and in a ratio of 1:2. In the same figure reference numerals 3 and 4 depict Ba and O, respectively.

On the other hand, according to "Microwave Dielectric Materials and their Applications," the Annual Report of Study Group for the practical use of $BaTiO_3$ material vol. 30 xxx-164-1036, Sept. 11, 1981, the ordered structure of $Ba(Zn_{1/3}Ta_{2/3})O_3$ may depend largely upon the sintering conditions. According to the report, the ordered arrangement of Zn and Ta can not be achieved, when sintered at 1,350° C. for about 2 hours, thus failing to improve Q value. When sintered at the same temperature for 120 hours the ordered arrangement is realized with the Q value being 14,000. Further, when the material is sintered at 1,650° C. for 2 hours, the Q value thereof becomes 10,000 to 11,000. This is consistent with the data of FIG. 2, which shows the dependency of an X-ray diffraction pattern in the superlattice with sintering time.

In the first case, i.e. when the sintering temperature is 1,350° C., it is necessary to maintain the temperature for a time period as long as 120 hours to obtain the ordered arrangement of Zn and Ta, which is a considerable obstacle in improving productivity and leads to increase of manufacturing cost. Therefore this can not be used in the industrial scale.

In the case where the material is sintered at the higher temperature, it is possible to obtain the ordered arrangement of Zn and Ta for a relatively short time. However, since there is evaporation of Zn at such high temperatures, it is impossible to obtain a dense ceramic. That is, the density is decreased, for example, from 7.7 g/cm³ to 6.5 g/cm³. Therefore, the resultant ceramic cannot be used with sufficient reliability in humid environments. Further the sintering furnace itself must be designed specially to accomodate such high temperatures and requires a large amount of energy to maintain the high temperature.

SUMMARY OF THE INVENTION

The inventors conducted research to solve these problems and have found that an improvement in sintering conditions and an enhancement of crystallization can be realized by using a new ceramic composition having a complex perovskite structure.

Therefore an object of the present invention is to provide a dielectric ceramic composition for high frequency use, by which a high dielectricity and high Q value are obtained at high frequency and whose temperature coefficient of resonant frequency can be selected with a center value of 0 ppm/°C., without using high sintering temperatures and/or long sintering times.

The object of the present invention can be achieved by a high frequency ceramic composition which can be represented by the formula: $Ba(Zr_xZn_yTa_z)O_{7/2-x/2-3y/2}$ wherein $0.02 \leq x \leq 0.13$, $0.28 \leq y \leq 0.33$, $0.59 \leq z \leq 0.65$ (where $x+Y+z=1$).

It is preferable in the present invention that the ceramic generally represented by the above general formula is composed of BaO, $ZrO_2$, ZnO and $Ta_2O_5$ and 70 atom% or less of Zn is substituted by Ni and/or Co.

It is further preferable that the ceramic further contains 0.1 to 10.0 mol% of at least one of the lanthanide oxides having the formula: $Me_2O_3$.

BRIEF DESCRIPTION OF THE DRAWINGS

FIG. 1 shows the crystal structure of $Ba(Zn_{1/3}Ta_{2/3})O_3$.

FIG. 2 is a change of structures shown in relation to the sintering time of $Ba(Zn_{1/3}Ta_{2/3})O_3$.

FIGS. 5(a) and 5(b) are X-ray diffraction patterns of $Ba(Zn_{1/3}Ta_{2/3})O_3$ and $Ba(Zr_{0.04}Zn_{0.32}Ta_{0.64})O_3$, respectively.

FIGS. 6(a) and 6(b) are sketches showing grain sizes of $Ba(Zn_{1/3}Ta_{2/3})O_3$ and $Ba(Zr_{0.04}Zn_{0.32}Ta_{0.64})O_3$, respectively.

FIGS. 7(a) and 7(b) are diffraction lines of $K_{\alpha 1}$ and $K_{\alpha 2}$ due to the (321) plane of the cubic crystals of $Ba(Zn_{1/3}Ta_{2/3})O_3$ and $Ba(Zr_{0.04}Zn_{0.32}Ta_{0.64})O_3$, respectively.

DETAILED DESCRIPTION OF THE INVENTION

The ranges of x, y and z in the formula: $Ba(Zr_xZn_yTa_z)O_{7/2-x/2-3y/2}$ determine the properties of the ceramic. The Q value becomes low when x is smaller than 0.02 and the temperature coefficient of resonant frequency becomes large in a positive side when x exceeds 0.13. The sintering of the ceramic becomes difficult when y is smaller than 0.28 or larger than 0.33. The sintering becomes difficult when z is smaller than 0.59 or larger than 0.65.

In the case where Zn in $Ba(Zr_xZn_yTa_z)O_{7/2-x/2-3y/2}$ is substituted by Ni and/or Co, the temperature coefficient of resonant frequency becomes too large in the negative side when the amount of substitution exceeds 70 atom%. Therefore the amount should be 70 atom% at most.

As to the amount of lanthanide oxide to be added to the ceramic, the addition itself has no effect on improvement of the Q value when the amount thereof is smaller than 0.1 mol% and both the dielectricity and Q value are lowered when it is larger than 10.0 mol%.

DESCRIPTION OF THE PREFERRED EMBODIMENTS

The present invention will be described in detail with reference to following examples.

EXAMPLE 1

High purity (99.8 to 99.9%) $BaCO_3$, $ZrO_2$, ZnO and $Ta_2O_5$ were prepared. Amounts of them were weighed so that ceramics having the composition shown in Table 1 were obtained. Weighed amounts of them, together with agate stone and pure water were put in a ball mill having inner wall covered with a rubber layer and wet-mixed therein for 2 hours. The resultant mixture was dehydrated, dried and then nominally calcined at 1,200° C. for 2 hours. Thereafter, the calcined mixture, together with agate stone, pure water and organic binder, was put in a ball mill and wet-crushed for 2 hours. The crushed mixture was dried and passed through a 50 mesh filter to regulate particle size thereof. Resultant powder was shaped into circular discs, each having a diameter of 12 mm$\phi$ and a thickness of 6 mm under a pressure of 2,000 kg/cm$^2$. The discs were sintered at 1,450° C. for 4 hours, to form the ceramic samples.

The dielectric constant ($\epsilon$), Q at a frequency of 11 GHz and temperature coefficient ($\tau_f$) of resonant frequency of each ceramic sample were measured by the dielectric resonator method, the result being shown in the Table 1. In the Table 1, the asterisks (*) mark the comparative examples.

Figure 3:
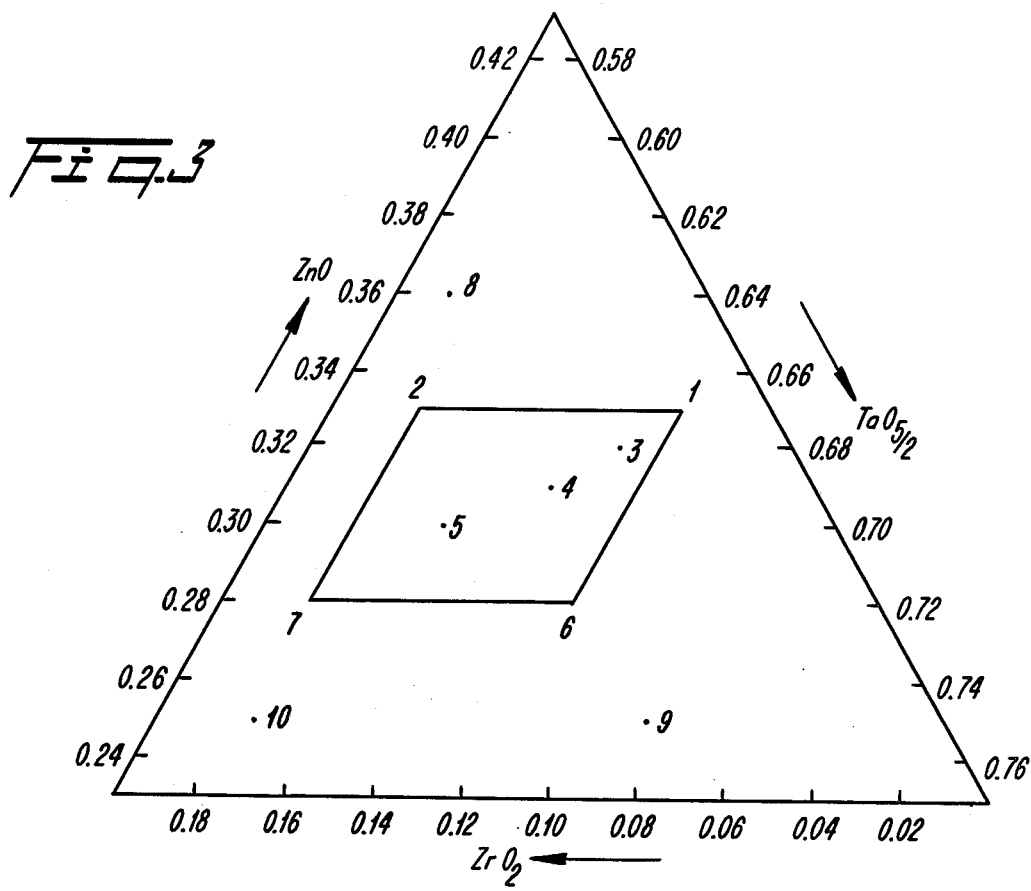
FIG. 3 is the ternary composition ranges of $ZrO_2$, ZnO and $TaO_{5/2}$ according to one of the present compositions.

FIG. 3 shows ranges of respective compositions $ZrO_2$, ZnO and $TaO_{5/2}$ among the ceramic compositions in which the sample numbers correspond to these in the Table 1, respectively.

The temperature coefficient ($\tau_f$) of resonant frequency is determined according to the following equations where $f_{25}$ and $f_{85}$ are resonant frequencies at 25° C. and 85° C., respectively:

$$\tau_f = \frac{1}{f_0} \cdot \frac{\Delta f}{\Delta T} = \frac{1}{f_{25}} \cdot \frac{(f_{85} - f_{25})}{(85 - 25)}$$

The relation among $\tau_f$, temperature variation $\tau\epsilon$ of dielectricity ($\epsilon$) and linear expansion coefficient of the material ($\alpha$) can be represented by $\tau_f = -\frac{1}{2}\tau\epsilon - \alpha$.

Therefore, $\tau\epsilon$ can be determined when for example, $\alpha$ is measured.

TABLE 1

| Sample No. | Composition x | y | z | $\epsilon$ | Q | $\tau_f$ (ppm/°C.) |
|---|---|---|---|---|---|---|
| 1 | 0.02 | 0.33 | 0.65 | 28.5 | 7,100 | 1 |
| 2 | 0.08 | 0.33 | 0.59 | 27.2 | 6,400 | −1 |
| 3 | 0.04 | 0.32 | 0.54 | 30.6 | 10,300 | 8 |
| 4 | 0.06 | 0.31 | 0.63 | 30.4 | 9,900 | 7 |
| 5 | 0.09 | 0.30 | 0.61 | 30.7 | 7,900 | 11 |
| 6 | 0.07 | 0.28 | 0.65 | 31.2 | 6,300 | 8 |
| 7 | 0.13 | 0.28 | 0.59 | 32.0 | 7,000 | 16 |
| 8* | 0.06 | 0.36 | 0.58 | Not sintered | | |
| 9* | 0.07 | 0.25 | 0.68 | Not sintered | | |
| 10* | 0.16 | 0.25 | 0.59 | 35.0 | 7,000 | 30 |

As will be clear from the Table 1, the composition of $Ba(Zr_xZn_yTa_z)O_{7/2-x/2-3y/2}$ exhibited high dielectricity and good $\tau_f$. Particularly, the maximum value of Q thereof became even 10,300.

Some of the comparative examples (Sample Nos. 8 to 10) were impossible to sinter and others had too large $\tau_f$ to be used practically.

On the other hand, a sample having conventional composition $Ba(Zn_{1/3}Ta_{2/3})O_3$ was prepared similarly and respective electric characteristics thereof were measured. Results are shown in a Table 2. For this composition, however, the reproducibility of dense ceramics was low and a considerable percentage of ceramics obtained occupied by these not sintered enough.

TABLE 2

| Composition | $\epsilon$ | Q | $\tau_f$ (ppm/°C.) |
|---|---|---|---|
| $Ba(Zn_{\frac{1}{3}}Ta_{\frac{2}{3}})O_3$ | 28.4 | 6,700 | 1 |

The conventional ceramic having a composition of $Ba(Zn_{1/3}Ta_{2/3})O_3$ and exhibiting the characteristics in Table 2 may be one of the best ceramics belonging to $Ba(ZnTa)O_3$ type in view of the Q value. Comparison of Q value of this ceramic having composition of $Ba(Zn_{1/3}Ta_{2/3})O_3$ with the highest Q value of the compositions in Table 1 (10,300) shows that the present compositions, $Ba(Zr_xZn_yTa_z)O_{7/2-x/2-3y/2}$, have Q values improved by 50%.

Figure 4:
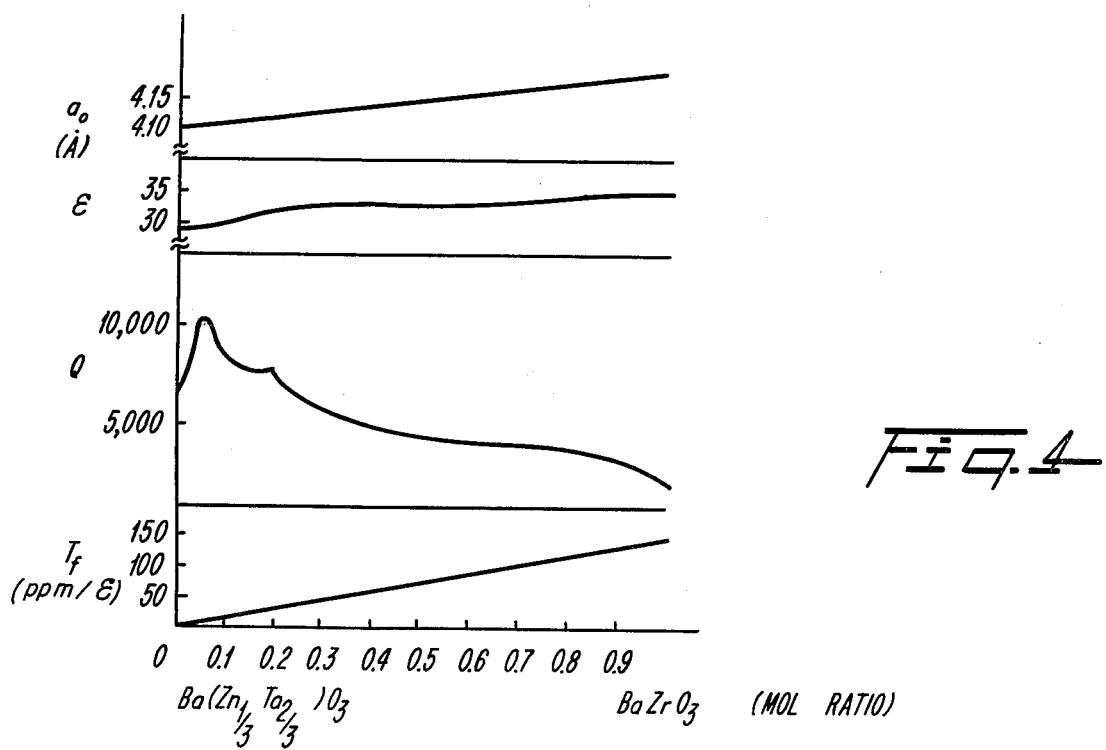
FIG. 4 is electric characteristics of a solid solution of $Ba(Zn_{1/3}Ta_{2/3})O_3$—$BaZrO_3$ group.
Figure 3A:
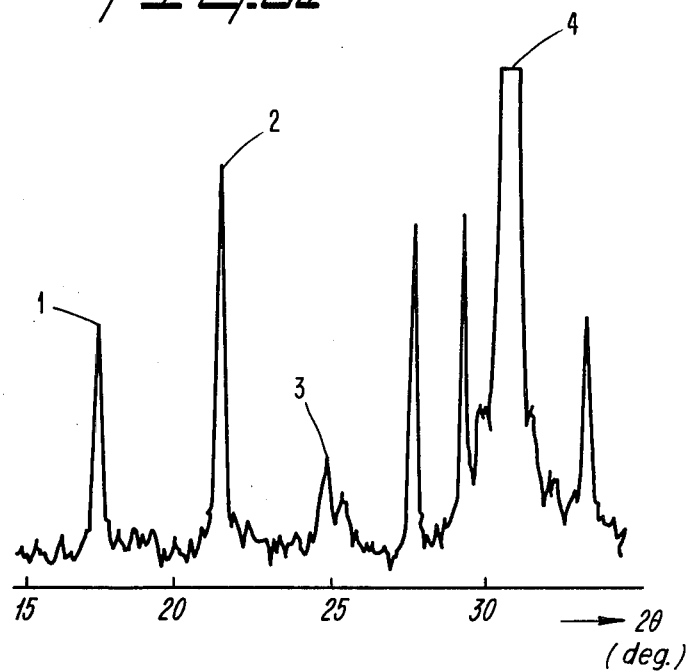
Figure 3B:
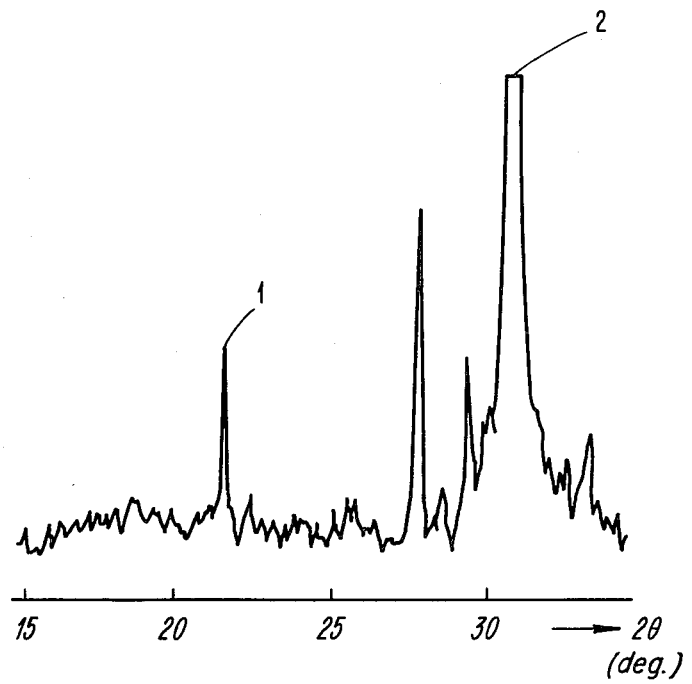

FIG. 4 shows electric characteristics of a solid solution of $Ba(Zn_{1/3}Ta_{2/3})O_3$ and $BaZrO_3$ prepared to clarify the effect of $ZrO_2$ in the ceramic. It is clear from FIG. 4, that the Q value becomes high when mol% of $BaZrO_3$ is within the range 0.02 to 0.13.

FIGS. 5(a) and 5(b) show X-ray diffraction patterns of $Ba(Zn_{1/3}Ta_{2/3})O_3$ and $Ba(Zr_{0.04}Zn_{0.32}Ta_{0.64})O_3$, respectively. In FIG. 5(a), a peak 1 at 17.7° is a diffraction line due to a (100) plane of hexagonal superstructure and shows the formation of a superlattice. On the other hand, the diffraction pattern of $Ba(Zr_{0.04}Zn_{0.32}Ta_{0.64})O_3$ shown in FIG. 5(b) shows a disappearance of the diffraction line due to the hexagonal superstructure shown in FIG. 5(a) and, only a cubic perovskite structure is formed.

In FIG. 5(a), reference numerals 1 and 3 correspond to a (100) plane and a (002) plane of a hexagonal crystal showing the formation of superlattice structure, respectively, and 2 and 4 correspond to a (100) plane and a (110) plane of cubic unit cell, respectively. In FIG. 5(b), reference numerals 1 and 2 are a (100) plane and a (110) plane of a cubic unit cell, respectively.

FIGS. 6(a) and 6(b) are sketches of SEM figures showing microstructural grain growth of $Ba(Zn_{1/3}Ta_{2/3})O_3$ and $Ba(Zr_{0.04}Zn_{0.32}Ta_{0.64})O_3$ after being sintered at 1,500° C. for 4 hours, respectively. From FIGS. 6(a) and 6(b), it is clear that the speed of grain growth is much increased by adding $BaZrO_3$.

FIGS. 7(a) and 7(b) are $K_{\alpha 1}$ and $K_{\alpha 2}$ diffraction lines of cubic (321) planes of $Ba(Zn_{1/3}Ta_{2/3})O_3$ and $Ba(Zr_{0.04}Zn_{0.32}Ta_{0.64})O_3$, respectively.

Comparing FIG. 7(a) with FIG. 7(b), it is clear that $K_{\alpha 1}$ and $K_{\alpha 2}$ are clearly separated from each other in the case of the $Ba(Zr_{0.04}Zn_{0.32}Ta_{0.64})O_3$ composition and that Zr provides a shortening effect on the sintering time even under the same sintering conditions.

In FIG. 7(a), reference numerals 1 and 2 represent $K_{\alpha 1}$ line and $K_{\alpha 2}$ line of a (321) plane of a cubic crystal respectively and, in FIG. 7(b), reference numerals 1 and 2 are $K_{\alpha 1}$ line and $K_{\alpha 2}$ line of (320) plane of a cubic crystal respectively.

Thus, the crystal structure of the composition $Ba(Zr_xZn_yTa_z)O_{7/2-x/2-3y/z}$ is the simple perovskite type cubic structure and is distinguishable from $Ba(Zn_{1/3}Ta_{2/3})O_3$ having the superlattice crystal structure.

Further since the composition $Ba(Zr_xZn_yTa_z)O_{7/2-x/2-3y/2}$ exhibits a higher Q value under conditions where the material is sintered at 1,450° C. for 4 hours, there is no need of sintering for such long time as 120 hours which is necessary to obtain a high Q value in case of $Ba(Zn_{1/3}Ta_{2/3})O_3$. Further, the temperature coefficient ($\tau_f$) of resonant frequency of the composition $Ba(Zr_xZn_yTa_z)O_{7/2-x/2-3y/2}$ is $-1$ to $+16$ ppm/°C. and the control of it around 0 ppm/°C. is considerable in, particularly the positive side.

EXAMPLE 2

High purity (99.8 to 99.9%) $BaCO_3$, $ZrO_2$, ZnO, $Ta_2O_5$, NiO and $Co_2O_3$ were prepared. Amounts of them were weighed so that ceramics having composition ratio shown in a Table 3 were obtained. Weighed amounts of them were treated in the same manner as that in the Example 1, resulting in ceramic samples.

Dielectric constant ($\epsilon$) at a frequency of 11 GHz, Q and temperature coefficient ($\tau_f$) of resonant frequency were measured as in Example 1, results being shown in the Table 3, in which asterisks (*) mark the comparative examples.

TABLE 3

| Sample No. | $Ba(Zr_xZn_yTa_z)O_{7/2-x/2-3y/2}$ | | | Substitution Amount (atom %) | $\epsilon$ | Q | $\tau_f$ (ppm/°C.) |
| --- | --- | --- | --- | --- | --- | --- | --- |
| | x | y | z | | | | |
| 1* | 0.02 | 0.33 | 0.65 | 0 | 28.5 | 7,100 | 1 |
| 2 | " | " | " | Ni: 5 | 28.5 | 7,000 | 0 |
| 3 | " | " | " | Ni: 35 | 26.8 | 7,000 | −5 |
| 4 | " | " | " | Ni: 70 | 25.3 | 6,800 | −10 |
| 5* | " | " | " | Ni: 95 | 23.7 | 6,600 | −16 |
| 6 | 0.02 | 0.33 | 0.65 | Co: 5 | 28.3 | 7,100 | 1 |
| 7 | " | " | " | Co: 35 | 27.6 | 7,000 | −3 |
| 8 | " | " | " | Ni: 35 Co: 35 | 26.4 | 6,800 | −11 |
| 9* | " | " | " | Co: 95 | 25.9 | 6,300 | −14 |
| 10* | 0.08 | 0.33 | 0.59 | 0 | 27.2 | 6,400 | −1 |
| 11 | " | " | " | Ni: 5 | 27.0 | 6,400 | −1 |
| 12 | " | " | " | Ni: 35 | 26.7 | 6,400 | −4 |
| 13 | " | " | " | Ni: 70 | 26.3 | 6,300 | −7 |
| 14* | " | " | " | Ni: 95 | 25.9 | 6,200 | −11 |
| 15 | " | " | " | Co: 5 | 27.2 | 6,400 | −1 |
| 16 | " | " | " | Co: 35 | 26.9 | 6,500 | −4 |
| 17 | " | " | " | Ni: 35 Co: 35 | 26.7 | 6,300 | −8 |
| 18* | 0.04 | 0.32 | 0.65 | 0 | 30.6 | 10,300 | 8 |
| 19 | " | " | " | Ni: 5 | 30.4 | 10,300 | 7 |
| 20 | " | " | " | Ni: 35 | 28.9 | 9,900 | 0 |
| 21 | " | " | " | Ni: 70 | 27.5 | 9,400 | 7 |
| 22* | " | " | 0.64 | Ni: 95 | 26.0 | 8,300 | −14 |
| 23 | " | " | " | Co: 5 | 30.6 | 10,000 | 7 |
| 24 | " | " | " | Co: 35 | 29.0 | 9,700 | 2 |
| 25 | " | " | " | Ni: 35 Co: 35 | 27.9 | 9,300 | −5 |
| 26* | 0.06 | 0.31 | 0.63 | 0 | 30.4 | 9,900 | 7 |
| 27 | " | " | " | Ni: 5 | 30.1 | 9,900 | 6 |
| 28 | " | " | " | Ni: 35 | 28.6 | 9,700 | −2 |
| 29 | " | " | " | Ni: 70 | 27.1 | 9,300 | −8 |
| 30 | " | " | " | Co: 5 | 30.1 | 9,800 | 6 |
| 31 | " | " | " | Co: 35 | 28.8 | 9,600 | 0 |
| 31 | " | " | " | Ni: 35 Co: 35 | 27.7 | 8,900 | −8 |
| 33* | " | " | " | Co: 95 | 26.5 | 7,900 | −13 |
| 34* | 0.09 | 0.30 | 0.61 | 0 | 30.7 | 8,300 | 11 |
| 35 | " | " | " | Ni: 5 | 30.5 | 8,300 | 11 |
| 36 | " | " | " | Ni: 35 | 28.8 | 8,300 | 4 |
| 37 | " | " | " | Ni: 70 | 27.5 | 8,100 | −3 |
| 38 | " | " | " | Co: 5 | 30.4 | 8,400 | 11 |
| 39 | " | " | " | Co: 35 | 29.5 | 8,200 | 6 |
| 40 | " | " | " | Ni: 35 Co: 35 | 27.8 | 8,200 | 0 |
| 41* | 0.07 | 0.28 | 0.65 | 0 | 31.2 | 6,300 | 8 |
| 42 | " | " | " | Ni: 5 | 30.8 | 6,400 | 7 |
| 43 | " | " | " | Ni: 35 | 28.0 | 6,200 | −1 |

TABLE 3-continued

| Sample No. | $Ba(Zr_xZn_yTa_z)O_{7/2-x/2-3y/2}$ x | y | z | Substitution Amount (atom %) | $\epsilon$ | Q | $\tau_f$ (ppm/°C.) |
|---|---|---|---|---|---|---|---|
| 44 | " | " | " | Ni: 70 | 25.5 | 5,900 | −10 |
| 45 | " | " | " | Co: 5 | 30.7 | 6,400 | 7 |
| 46 | 0.07 | 0.28 | 0.65 | Co: 35 | 28.5 | 6,100 | 0 |
| 47 | " | " | " | Ni: 35 Co: 35 | 25.8 | 5,800 | −9 |
| 48* | 0.13 | 0.28 | 0.59 | 0 | 32.0 | 7,000 | 16 |
| 49 | " | " | " | Ni: 5 | 31.4 | 7,000 | 16 |
| 50 | " | " | " | Ni: 35 | 29.1 | 6,600 | 8 |
| 51 | " | " | " | Ni: 70 | 27.0 | 6,000 | −1 |
| 52 | " | " | " | Ni: 95 | 24.0 | 5,100 | −9 |
| 53 | " | " | " | Co: 5 | 31.8 | 7,000 | 15 |
| 54 | " | " | " | Co: 35 | 29.5 | 6,600 | 7 |
| 55 | " | " | " | Ni: 35 Co: 35 | 26.4 | 6,100 | −4 |
| 56* | 0.06 | 0.36 | 0.58 | 0 | — | — | — |
| 57* | " | " | " | Ni: 35 | — | — | — |
| 58* | " | " | " | Co: 35 | — | — | — |
| 59* | 0.07 | 0.25 | 0.68 | 0 | — | — | — |
| 60* | " | " | " | Ni: 35 | — | — | — |
| 61* | " | " | " | Co: 35 | — | — | — |
| 62 | 0.16 | 0.25 | 0.59 | 0 | 35.0 | 7,000 | 30 |
| 63* | " | " | " | Ni: 35 | 33.2 | 6,300 | 26 |
| 64* | " | " | " | Co: 35 | 34.0 | 5,300 | 28 |

In the Table 3, Sample Nos. 1, 10, 18, 26, 34, 41 and 48 contain compositions each containing Zn a portion of which was not substituted by Ni and/or Co.

Sample Nos. 5, 9, 14, 22 and 33 contain compositions each containing Zn a portion of which was substituted by Ni and/or Co, the substitution amount exceeding 70 atom%. There is a tendency, for such samples, that the temperature coefficient of resonant frequency becomes large in the negative side.

x, y and z values of $(Zr_xZn_yTa_z)O_{7/2-x/2-3y/2}$ of each of Sample Nos. 56 to 64 were out of the ranges defined by the present invention and for that reason it was difficult for them to be sintered. No characteristics of samples 56 to 61 were shown in the table, because it was impossible to obtain well sintered ceramic samples and so that characteristics of them could not be measured.

As described hereinbefore, according to the composition $Ba(Zr_xZn_yTa_z)O_{7/2-x/2-3y/2}$ whose Zn is substituted by Ni and/or Co, both of the dielectricity and the Q of the resultant ceramic are high and the temperature coefficient of resonant frequency thereof can be selectively obtained in either positive or negative side from 0 ppm/°C. Particularly, with the substitution of Ni and/or Co for a portion of Zn, it becomes possible to control the temperature coefficient of resonant frequency in the negative side.

EXAMPLE 3

High purity (99.8 to 99.9%) $BaCO_3$, $ZrO_2$, ZnO, $Ta_2O_5$, NiO, $Co_2O_3$, $La_2O_3$, $CeO_2$, $Sm_2O_3$, $Dy_2O_3$, $Ho_2O_3$ and $Pr_2O_3$ were prepared. Amounts of them were weighed so that ceramics having composition ratio shown in a Table 4 were obtained and weighed amounts of them were treated in the same manner as that in the Example 1, resulting in ceramic samples. Dielectric constant ($\epsilon$), Q at a frequency of 11 GHz, and the temperature coefficient ($\tau_f$) of resonant frequency were measured as in the Example 1, results being shown in a Table 4 in which asterisks (*) mark the comparative examples.

TABLE 4

| Sample No. | $Ba(Zr_xZn_yTa_z)O_{7/2-x/2-3y/2}$ x | y | z | Substitution amount (atom %) | $Me_2O_3$ Me | Amount (mol %) | $\epsilon$ | Q | $\tau_f$ (ppm/°C.) |
|---|---|---|---|---|---|---|---|---|---|
| 1* | 0.02 | 0.33 | 0.65 | 0 | — | 0 | 28.5 | 7,100 | 1 |
| 2* | " | " | " | Ni: 5 | — | 0 | 28.5 | 7,000 | 0 |
| 3* | " | " | " | Ni: 35 | — | 0 | 26.8 | 7,000 | −5 |
| 4 | " | " | " | Ni: 5 | La | 0.1 | 28.6 | 7,400 | 0 |
| 5 | " | " | " | Ni: 35 | " | 1.0 | 27.0 | 7,400 | −8 |
| 6 | " | " | " | Ni: 35 Co: 35 | " | 1.0 | 26.7 | 7,500 | −9 |
| 7 | " | " | " | Co: 35 | " | 10.0 | 27.8 | 7,400 | 0 |
| 8* | " | " | " | Co: 95 | " | 10.0 | 26.1 | 6,800 | −12 |
| 9* | " | " | " | Co: 35 | " | 20.0 | 27.3 | 5,800 | 2 |
| 10* | 0.08 | " | 0.59 | Ni: 35 | — | 0 | 26.7 | 6,400 | −4 |
| 11 | " | " | " | Ni: 35 | Ce | 0.1 | 26.8 | 6,800 | −8 |
| 12 | " | " | " | Ni: 35 | " | 1.0 | 27.0 | 7,100 | −2 |
| 13 | " | " | " | Ni: 35 Co: 35 | " | 1.0 | 26.9 | 7,000 | −5 |
| 14 | " | " | " | Co: 35 | " | 10.0 | 27.1 | 6,500 | −1 |
| 15* | " | " | " | Co: 35 | " | 20.0 | 26.1 | 5,100 | 2 |
| 16* | 0.04 | 0.32 | 0.64 | Ni: 5 | — | 0 | 30.4 | 10,300 | 7 |
| 17* | " | " | " | Ni: 35 | " | 0 | 28.9 | 9,900 | 0 |
| 18 | " | " | " | Ni: 5 | Ce | 0.1 | 30.5 | 10,600 | 8 |
| 19 | " | " | " | Ni: 35 | " | 1.0 | 29.2 | 10,700 | 2 |

TABLE 4-continued

| Sample No. | $Ba(Zr_xZn_yTa_z)O_{7/2-x/2-3y/2}$ | | | Substitution amount (atom %) | | $Me_2O_3$ Amount (mol %) | $\epsilon$ | Q | $\tau_f$ (ppm/°C.) |
|---|---|---|---|---|---|---|---|---|---|
| | x | y | z | | Me | | | | |
| 20 | " | " | " | Ni: 35 Co: 35 | " | 1.0 | 28.2 | 10,000 | −3 |
| 21 | " | " | " | Co: 35 | " | 10.0 | 29.2 | 9,900 | 5 |
| 22* | " | " | " | Co: 35 | " | 20.0 | 28.2 | 8,200 | 8 |
| 23* | 0.06 | 0.31 | 0.63 | Ni: 35 | — | 0 | 28.6 | 9,700 | −2 |
| 24 | " | " | " | Ni: 35 | Sm | 0.1 | 28.7 | 9,900 | −2 |
| 25 | " | " | " | Ni: 35 | Dy | 1.0 | 28.9 | 10,600 | 0 |
| 26 | " | " | " | Ni: 35 Co: 35 | Ho | 1.0 | 28.0 | 9,600 | −5 |
| 27 | " | " | " | Co: 35 | Pr | 10.0 | 29.0 | 9,700 | 3 |
| 28* | " | " | " | Co: 35 | Sm | 20.0 | 28.0 | 7,800 | 7 |
| 29* | 0.09 | 0.30 | 0.61 | Ni: 5 | — | 0 | 30.5 | 8,300 | 11 |
| 30* | " | " | " | Ni: 35 | " | 0 | 28.8 | 8,300 | 4 |
| 31 | " | " | " | Ni: 5 | Sm | 0.1 | 30.6 | 8,700 | 11 |
| 32 | " | " | " | Ni: 35 | La Ce | 0.5 0.5 | 29.1 | 9,100 | 6 |
| 33 | " | " | " | Ni: 35 Co: 35 | Ho Pr | 0.5 0.5 | 28.2 | 9,200 | 2 |
| 34 | " | " | " | Co: 35 | Sm | 10.0 | 29.7 | 8,400 | 8 |
| 35* | " | " | " | Co: 35 | " | 20.0 | 28.8 | 6,900 | 14 |
| 36* | 0.07 | 0.28 | 0.65 | Ni: 35 | — | 0 | 28.0 | 6,200 | −1 |
| 37 | " | " | " | Ni: 35 | Sm | 0.1 | 28.2 | 6,900 | 0 |
| 38 | " | " | " | Ni: 35 | " | 1.0 | 28.3 | 7,000 | 1 |
| 39 | " | " | " | Ni: 35 Co: 35 | " | 1.0 | 26.2 | 6,600 | −6 |
| 40 | " | " | " | Co: 35 | " | 10.0 | 28.8 | 6,400 | 3 |
| 41* | " | " | " | Co: 35 | " | 20.0 | 27.6 | 5,100 | 7 |
| 42* | 0.13 | 0.28 | 0.59 | Ni: 5 | — | 0 | 31.4 | 7,000 | 16 |
| 43* | " | " | " | Ni: 35 | — | 0 | 29.1 | 6,600 | 8 |
| 44 | " | " | " | Ni: 5 | Sm | 0.1 | 31.5 | 7,400 | 16 |
| 45 | " | " | " | Ni: 35 | " | 1.0 | 31.7 | 7,300 | 9 |
| 46 | " | " | " | Ni: 35 Co: 35 | " | 1.0 | 26.7 | 7,000 | 0 |
| 47 | " | " | " | Co: 35 | " | 10.0 | 29.7 | 6,800 | 9 |
| 48* | " | " | " | Co: 35 | " | 20.0 | 28.6 | 5,300 | 14 |
| 49* | 0.06 | 0.36 | 0.58 | 0 | — | 0 | — | — | — |
| 50* | " | " | " | Ni: 35 | Sm | 0.1 | — | — | — |
| 51* | " | " | " | Co: 35 | " | 1.0 | 29.6 | 1,200 | −12 |
| 52* | 0.07 | 0.25 | 0.68 | 0 | — | 0 | — | — | — |
| 53* | " | " | " | Ni: 35 | Sm | 0.1 | — | — | — |
| 54* | " | " | " | Co: 35 | " | 1.0 | 23.5 | 2,300 | 20 |
| 55* | 0.16 | " | 0.59 | 0 | — | 0 | 35.0 | 7,000 | 30 |
| 56* | " | " | " | Ni: 35 | Sm | 0.1 | 33.4 | 6,500 | 28 |
| 57* | " | " | " | Co: 35 | " | 1.0 | 34.4 | 5,800 | 30 |

In Table 4, each of Samples 1, 49, 52 and 55 has a composition in which a portion of Zn was not substituted by Ni and/or Co.

Sample 8 has a composition in which a portion of Zn was substituted by Ni and/or Co, the amount of substitution exceeding 70 atom%. This sample exhibits a tendency that the resonant frequency ($\tau_f$) becomes large in the negative side.

Each of Samples 1, 2, 3, 10, 16, 17, 23, 29, 30, 36, 42, 43, 49, 52 and 55 did not contain a lanthanide oxide ($Me_2O_3$).

Each of Samples 9, 15, 22, 28, 35, 41 and 48 contain 10 mol% or more of $Me_2O_3$ and have low dielectric constant and Q.

Each of Samples 49 to 57 has a composition $Ba(Zr_xZn_yTa_z)O_{7/2-x/2-3y/2}$ in which x, y and z are out of the ranges of the present invention. These samples were impossible to sinter or the characteristics thereof were low grade.

There are no characteristics shown for Samples 49, 50, 52 and 53. For those samples, it was impossible to obtain well sintered ceramics, i.e., it was impossible to measure their characteristics.

In this embodiment, $Me_2O_3$, i.e., a lanthanide oxide, is shown as including $La_2O_3$, $CeO_2$, $Sm_2O_3$, $Dy_2O_3$, $Ho_2O_3$ and $Pr_2O_3$. However it has been confirmed that when $Me_2O_3$ has the lanthanide oxide other than the abovementioned oxides, the same results as those described above can be provided.

As described in detail, according to the composition represented by $Ba(Zr_xZn_yTa_z)O_{7/2-x/2-3y/2}$ in which Zn in substituted by Ni and/or Co and further containing lanthanide oxide, a high frequency dielectric ceramic composition is obtained, which has a high dielectric constant and exhibits a high Q value due to the addition of lanthanide oxide. By suitably selecting the substitution amount of Ni and/or Co, the temperature coefficient at resonant frequency can be selectively determined in either the positive or negative side from 0 ppm/°C.

Therefore, the dielectric ceramic according to the present invention can be effectively applied to the dielectric resonator, the dielectric regulating rod and the dielectric substrate for MIC, etc.

Further, it has been confirmed that the compsition represented by $(Ba_{1-x}Sr_x)(Zr_xZn_yTa_z)O_{7/2-x/2-3y/2}$ or $Ba(Sn_xZn_yTa_z)O_{7/2-x/2-3y/2}$ provides effects analogous to those of the composition of the present invention.

While the invention has been described in detail and with reference to specific embodiment thereof, it will be apparent to one skilled in the art that various changes and modifications can be made therein without departing from the spirit and scope thereof.

What is claimed is:

1. A high frequency dielectric ceramic composition, said composition being represented by the formula: $Ba(Zr_xZn_yTa_z)O_{7/2-x/2-3y/2}$, wherein $0.02 \leq x \leq 0.13$, $0.28 \leq y \leq 0.33$ and $0.59 \leq z \leq 0.65$ (where $x+y+z=1$), said composition having a Q value significantly enhanced by the inclusion of Zr.

2. The high frequency dielectric ceramic composition of claim 1, wherein at most 70 atom% of Zn is substituted by Ni, Co or mixtures thereof.

3. The high frequency dielectric ceramic composition of claim 2, wherein said composition further contains 0.1 to 10.0 mol% of at least one of the lanthanide oxides having the formula: $Me_2O_3$.

* * * * *